United States Patent [19]
Axelrod

[11] Patent Number: 6,126,978
[45] Date of Patent: *Oct. 3, 2000

[54] EDIBLE DOG CHEW

[75] Inventor: Glen S. Axelrod, Mahwah, N.J.

[73] Assignee: T.F.H. Publications, Inc., Neptune City, N.J.

[*] Notice: This patent is subject to a terminal disclaimer.

[21] Appl. No.: 09/138,804

[22] Filed: Aug. 21, 1998

Related U.S. Application Data

[63] Continuation-in-part of application No. 08/738,423, Oct. 25, 1996, Pat. No. 5,827,565.

[51] Int. Cl.⁷ .................................................. A23L 1/0522
[52] U.S. Cl. ........................ 426/285; 426/623; 426/630; 426/635; 426/805
[58] Field of Search ..................... 426/285, 623, 426/630, 635, 805

[56] References Cited

U.S. PATENT DOCUMENTS

| | | | |
|---|---|---|---|
| 3,821,446 | 6/1974 | Estey et al. | 426/373 |
| 3,899,607 | 8/1975 | Miller et al. | 426/285 |
| 4,032,665 | 6/1977 | Miller et al. | 426/104 |
| 4,171,383 | 10/1979 | Chwalek et al. | 426/623 |
| 4,310,558 | 1/1982 | Nahm, Jr. | 426/98 |
| 4,315,034 | 2/1982 | Levinson et al. | 426/104 |
| 4,735,808 | 4/1988 | Scaglione et al. | 426/62 |
| 4,784,860 | 11/1988 | Christensen et al. | 426/46 |
| 4,800,099 | 1/1989 | Gellman et al. | 426/641 |
| 4,886,440 | 12/1989 | Forrest et al. | 425/208 |
| 4,892,748 | 1/1990 | Andersen et al. | 426/635 |
| 4,975,270 | 12/1990 | Kehoe | 426/48 |
| 5,000,973 | 3/1991 | Scaglione et al. | 426/549 |
| 5,094,870 | 3/1992 | Scaglione et al. | 426/549 |
| 5,200,212 | 4/1993 | Axelrod | 426/2 |
| 5,240,720 | 8/1993 | Axelrod | 426/2 |
| 5,296,209 | 3/1994 | Simone et al. | 424/49 |
| 5,419,283 | 5/1995 | Leo | 119/709 |
| 5,476,069 | 12/1995 | Axelrod | 119/709 |
| 5,591,491 | 1/1997 | Ando | 427/544 |

FOREIGN PATENT DOCUMENTS

| | | |
|---|---|---|
| 2705864 | 6/1993 | France . |
| 3701861 | 8/1988 | Germany . |
| 19501142 | 7/1995 | Germany . |

*Primary Examiner*—Chhaya D. Sayala
*Attorney, Agent, or Firm*—Hayes, Soloway, Hennessey, Grossman & Hage, P.C.

[57] ABSTRACT

A heat expandable dog chew comprised primarily of injection molded potato starch, calcium carbonate, to which is added a fruit flavoring, a food coloring or a breath sweetener.

16 Claims, 1 Drawing Sheet

EDIBLE DOG CHEW

This application is a continuation-in-part of my U.S. patent application No. 08/738,423 filed Oct. 25, 1996, now U.S. Pat. No. 5,827,565.

BACKGROUND OF THE INVENTION

1. Field of the Invention

The present invention relates to dog chews, and more particularly, pertains to a potato starch-based or other vegetable starch-based, completely digestible, nutritious dog chew, the texture or hardness of which can be easily heat modified to suit a particular dog

2. Brief Description of the Prior Art

Most dogs enjoy chewing on things although preferences vary as to the hardness of the substances favored. Some dogs like to chew on very hard materials such as cow bones, wood or nylon, others prefer softer chews such as polyurethane or rubber, while still others favor freeze dried snacks. Some dogs, due to their age, may not be able to chew on the very hard substances. Young dogs have insufficiently developed teeth, while old dogs may have diseased gums or may have lost some of their teeth.

Many indigestible objects are given to dogs as a chew and although the dogs may enjoy chewing thereon, the objects are often swallowed in whole or in part. Once swallowed, these objects or fragments thereof can have an adverse effect on the dogs digestion and can become impacted in the dog's intestinal tract with life-threatening consequences. By way of example, dog chews have been marketed which utilize an ethylene copolymer which can be fractured by the chewing action of a dog, and when ingested can block the dog's stomach passages.

Other edible dog chews have been marketed which have a comparatively short shelf life and therefore must be replaced by retail outlets at frequent intervals. Yet other prior art dog chews are lacking in structural integrity whereby they are susceptible to breakage during handling and shipping.

Applicant's assignee, T.F.H. Publications, Inc., has previously developed an edible dog chew that is wholly digestible, nutritious and having a texture or hardness which is individually adjustable by the application of heat to suit a wide variety of dog's preferences or needs. Such dog chews utilize a mixture containing primarily casein and are disclosed in Herbert R. Axelrod U.S. Pat. Nos. 5,200,212 and 5,240,720. Such dog chews, while constituting a major improvement over other prior art edible dog chews, do not provide all the advantages of the dog chew of the present invention.

SUMMARY OF THE INVENTION

The present invention provides an edible dog chew that is completely digestible, nutritious, devoid of deleterious additives and of a modifiable texture or hardness that may be quickly and easily tailorable by the owner to suit the need or preference of his particular dog. In addition, such edible dog chews have a long shelf life as compared to prior edible dog chews. The chews are biodegradable and extremely rugged so as to be able to withstand shocks resulting from shipping and handling. Upon removal from the chew's package, the chew can be caused to swell up to 3 to 8 times its original volume, if desired, by subjecting it to microwave radiation. With this procedure, the chew's texture or hardness can be adjusted to any magnitude from its original high density extremely hard state to a low density expanded easily chewed state depending upon the amount of microwave exposure to which it is subjected. Accordingly, the chew can thereby be quickly and easily adjusted to the texture preference of a wide variety of dogs from a strong large healthy dog to a small puppy with puppy teeth or an older dog with decayed molars.

The present invention also provides a dog chew having natural fruit flavor to increase a dog's appetite for such chew. Such fruit flavored dog chew may include natural food coloring to enhance the attractiveness of the dog chew to dog owners. The food coloring may correspond to the fruit flavor if desired.

A dog chew of the present invention may also embody a breath sweetener for a dog such as mint, spearmint, peppermint or wintergreen and also include parsley.

Other features and advantages of the present invention will become apparent from the following detailed description taken into conjunction with the accompanying drawings which illustrate by way of example the principles of the invention.

DETAILED DESCRIPTION OF PREFERRED EMBODIMENTS

The preferred form of edible dog chew of the present invention has as a basic ingredient, a heat-expandable starch, such as a potato starch product sold under the trademark PARAGON IM 1010 by AVEBE of Veendam, The Netherlands. The PARAGON product is sold in the form of thermoplastic granules, beads or granules, which are manufactured by an extrusion process, and which are then molded into a desired shape. The weight contents of such extruded pellets, beads or granules are about 70% potato starch, about 15% water (about 10% after the granules are molded), about 5 to 10% calcium carbonate, and about 1 to 5% natural vegetable additives. To this granule pre-mixture is added an attractant such as chicken powder, liver powder, ham, turkey, beef, and/or fish in the amount of 1 to 5% by weight. Natural vegetable additives Such as spinach or carrots may also be added. The resultant mixture is molded under heat and pressure into a desired form, such as a dog bone. Molding can be accomplished in an injection molding machine at temperatures between 250 to 400 degrees F. and pressures of 1000 to 2500 PSI depending upon the injection molding machine utilized, the materials location within the molding machine, the type of additives, the particular mold, and the size of the bone being molded.

In accordance with the present invention, a fruit flavoring may be added to the granules of the mixture of potato starch, water and calcium carbonate before Such mixture is molded to increase a dog's appetite for the finished dog chew. Natural fruit flavorings are preferred. In addition, a bright food coloring may be added to such mixture to enhance the attractiveness of the dog chew to the dog owner. A natural food coloring is preferred, and the food coloring may correspond to the fruit flavor. The weight content of the fruit flavoring in such mixture may be 1 to 5%. Likewise, where a food coloring is added its weight content in such mixture may be 1–5%.

If desired, a breath sweetener may be added to the granule mixture before the molding step, e.g. mint, spearmint, peppermint or wintergreen and parsley. The weight content of such breath sweetener may be 1–3% spearmint, peppermint or wintergreen and 1–5% parsley.

Figure 1:
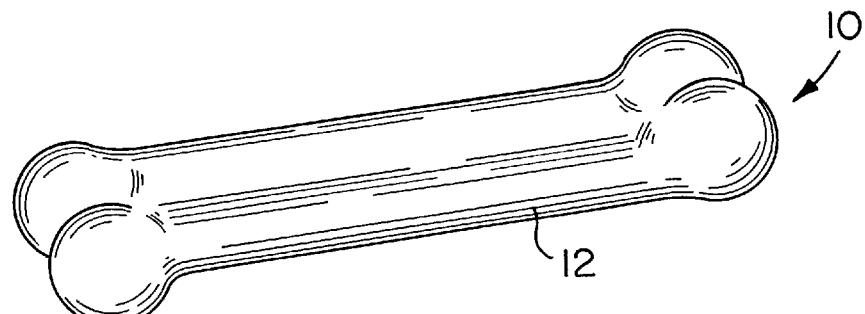
FIG. 1 illustrates a preferred embodiment of an edible dog chew embodying the present invention in its unexpanded state.
Figure 2:
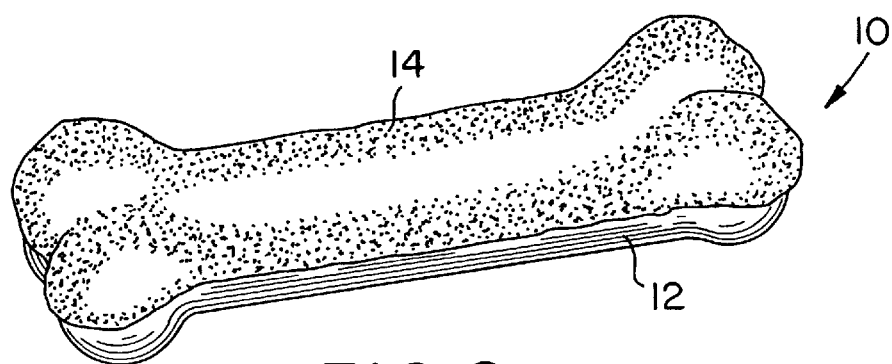
FIG. 2 illustrates the dog chew of FIG. 1 in its partially expanded state.
Figure 3:
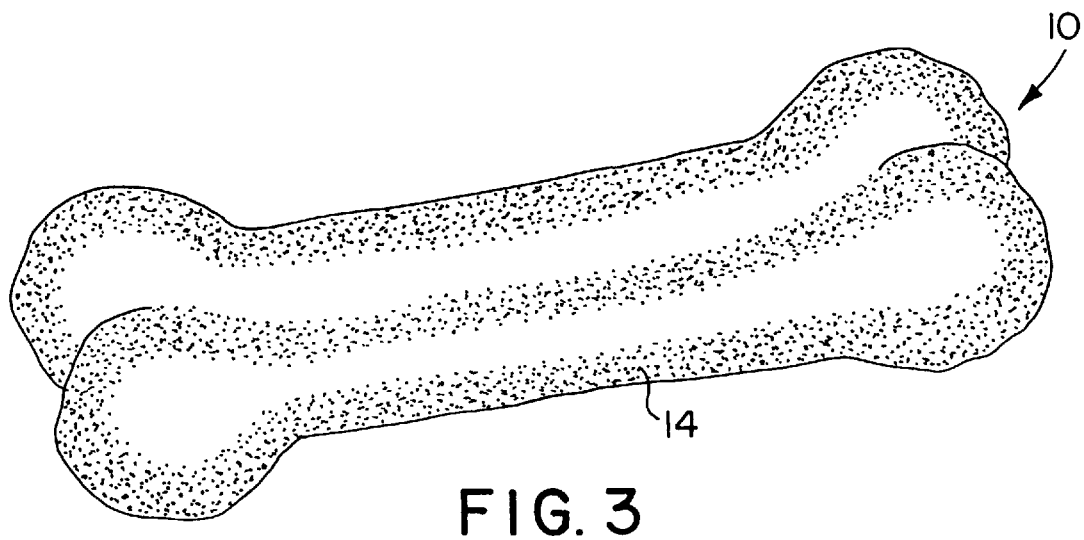
FIG. 3 illustrates the dog chew of FIG. 1 in its fully expanded state.

Upon removal from the package, the person feeding the dog can if desired modify the texture or hardness of the molded chew by heating, in a microwave oven. The expansion of the moisture within the chew causes the chew to expand. Subjecting the chew to microwave radiation facilitates the heating of areas deep within the chew at the same time the exterior heats up and expands. FIG. 1 illustrates the chew 10 prior to heating, in which state it has a substantially smooth exterior surface 12 and is of an extremely hard texture preferred by some dogs. A short exposure to microwave radiation initiates the expansion process. FIG. 2 illustrates the chew 10 in a partially expanded state evidenced by partially bubbled surface 14. In this state the chew 10 is of an intermediate hardness preferred by other dogs. FIG. 3 illustrates the chew 10 in a fully expanded state as may result from a 25 seconds to a 2 minute exposure in a standard household microwave oven, depending upon the size of the bone and the power setting of the oven. The entire chew 10 has a bubbled surface 14 and is easily chewable by most dogs. The chew in this state is ideal for small dogs with puppy teeth or old dogs who suffer from gum disease or may have lost teeth. Sufficient exposure to microwave radiation will cause the chew to expand up to about 3 to 8 times its original volume with a commensurate reduction in hardness.

In use, the chew is given to the dog in its initial hardness state. If the dog is unwilling or is unable to chew on it, the chew is microwaved for short time increments and re-offered to the dog until the chew reaches a state of expansion and degree of hardness preferred by the dog. Large, strong and healthy dogs would probably prefer the chew in its unmodified and hardest state, while very small, young or very old dogs would prefer the chew in its most expanded state.

It should be particularly noted that an edible dog chew made in accordance with the present invention does not dry out and fall apart after being packaged and accordingly can have a shelf life of several years without being packaged in a waterproof container. Additionally, the dog chew is extremely resistant to breakage during shipping and handling.

While a particular form of the invention has been illustrated and described it will be apparent to those skilled in the art that various modifications can be made without departing from the spirit and scope of the invention. Accordingly, it is not intended that the invention be limited except as by the appended claims.

What is claimed is:

1. A method of producing a hardness-adjustable edible dog chew, comprising the steps in sequence of:
    extruding a mixture of a heat-expandable potato starch, water and calcium carbonate to form granules;
    adding a fruit flavoring to such granules; and
    injection molding such ingredients into the shape of the dog chew.

2. The method of claim 1, wherein the weight content of the granules is about 70% starch, the weight content of the water is about 15%, the weight content of the fruit flavoring is about 1 to 5%, and the weight content of the water is reduced to about 10% during the injection molding step.

3. The method of claim 1, wherein the granules are injection molded at a pressure of about 1,000 to 2,500 PSI and at a temperature of about 250 to 400° F.

4. A method of producing a hardness-adjustable edible dog chew, comprising the steps in sequence of:
    extruding a mixture of a heat-expandable potato starch, water and calcium carbonate to form granules;
    adding a food coloring to such granules; and
    injection molding such ingredients into the shape of the dog chew.

5. The method of claim 4, wherein the weight content of the granules is about 70% starch, the weight content of the water is about 15%, the weight content of the food coloring is about 1 to 5%, and the weight content of the water is reduced to about 10% during the injection molding step.

6. A method of producing a hardness-adjustable edible dog chew, comprising the steps in sequence of:
    extruding a mixture of a heat-expandable potato starch, water and calcium carbonate to form granules;
    adding a fruit flavoring and a food coloring to such granules; and
    injection molding such ingredients into the shape of the dog chew.

7. The method of claim 6, wherein the weight content of the granules is about 70% starch, the weight content of the water is about 15%, the weight content of the fruit flavoring is about 1 to 5% and the weight content of the food coloring is about 1 to 5%, and the weight content of the water is reduced to about 10% during the injection molding step.

8. A method of producing a hardness-adjustable edible dog chew, comprising the steps in sequence of:
    extruding a mixture of a heat-expandable potato starch, water and calcium carbonate to form granules;
    adding a breath sweetener to such granules; and
    injection molding such ingredients into the shape of the dog chew.

9. The method of claim 8, wherein the weight content of the granules is about 70% starch, the weight content of the water is about 15%, the weight content of the breath sweetener is about 1 to 5%, and the weight content of the water is reduced to about 10% during the injection molding step.

10. An improved edible dog chew comprising:
    an injection molded mixture of a heat-expandable potato starch, water, calcium carbonate and a fruit flavoring.

11. An edible dog chew as set forth in claim 10, which further includes a breath sweetener.

12. An edible dog chew as set forth in claim 10 which further includes a food coloring.

13. An edible dog chew as set forth in claim 12, which further includes a breath sweetener.

14. An improved edible dog chew comprising:
    an injection molded mixture of a heat-expandable potato starch, water, calcium carbonate and a food coloring.

15. An edible dog chew as set forth in claim 14, which further includes a breath sweetener.

16. An improved edible dog chew comprising:
    an injection molded mixture of a heat-expandable potato starch, water, calcium carbonate and a breath sweetener.

* * * * *